United States Patent [19]

Mizuhara et al.

[11] Patent Number: 5,385,791

[45] Date of Patent: * Jan. 31, 1995

[54] GOLD-NICKEL-VANADIUM-MOLYB-DENUM BRAZING MATERIALS

[75] Inventors: Howard Mizuhara, Hillsborough; Eugene Huebel, Union City, both of Calif.

[73] Assignee: The Morgan Crucible Company plc, Windsor

[*] Notice: The portion of the term of this patent subsequent to Dec. 28, 2010 has been disclaimed.

[21] Appl. No.: 925,569

[22] Filed: Aug. 4, 1992

[51] Int. Cl.$^6$ .................. B23K 35/30; B32B 15/04; B32B 15/20; C22C 5/02

[52] U.S. Cl. .................. 428/621; 428/672; 428/457; 420/512; 228/262.6; 228/262.61

[58] Field of Search .............. 420/512; 148/405, 430; 228/263.18, 121, 122, 263.12; 428/621, 672, 457, 472.2, 469, 472, 606

[56] References Cited

U.S. PATENT DOCUMENTS

| | | | |
|---|---|---|---|
| 2,840,468 | 6/1958 | Brenner | 420/512 |
| 4,447,391 | 5/1984 | Mizuhara | 420/456 |
| 4,448,605 | 5/1984 | Mizuhara . | |
| 4,486,386 | 12/1984 | Mizuhara . | |
| 4,497,772 | 2/1985 | Mizuhara . | |
| 4,604,328 | 8/1986 | Mizuhara . | |
| 4,606,978 | 8/1986 | Mizuhara . | |
| 4,678,636 | 7/1987 | Mizuhara | 420/512 |
| 4,678,636 | 7/1987 | Mizuhara | 420/456 |
| 4,690,876 | 9/1987 | Mizuhara . | |
| 4,820,487 | 4/1989 | Antoniazzi | 420/512 |
| 4,938,922 | 7/1990 | Mizuhara . | |
| 5,273,832 | 12/1993 | Mizuhara . | |

FOREIGN PATENT DOCUMENTS

| | | | |
|---|---|---|---|
| 0005312 | 11/1979 | European Pat. Off. . | |
| 863714 | 1/1953 | Germany . | |
| 63-317276 | 12/1988 | Japan | 420/512 |
| 01246332 | 10/1989 | Japan | C22C 5/02 |

Primary Examiner—Melvyn J. Andrews
Assistant Examiner—Margery S. Phipps
Attorney, Agent, or Firm—Kilpatrick & Cody

[57] ABSTRACT

A ductile brazing material containing, by weight, 75–98% gold, 0.5–20% nickel, 0.5–6% vanadium, 0.25–5.9% molybdenum and, optionally chromium is disclosed for directly bonding ceramic/ceramic, ceramic/metal or metal/metal systems over an optimum temperature range.

8 Claims, No Drawings

GOLD-NICKEL-VANADIUM-MOLYBDENUM BRAZING MATERIALS

FIELD OF THE INVENTION

This invention relates to brazing materials. More particularly, the invention relates to brazing alloys and pastes containing gold, nickel, vanadium, molybdenum and, optionally, chromium.

BACKGROUND OF THE INVENTION

Brazing materials containing titanium (i.e., active element) are well known in the art. The titanium content of these materials is generally greater than 5% by weight. The brazing materials therefore exhibit a relatively high yield strength and upon brazing contain a brittle dispersed phase.

It is, however, well known in the art that the thermal expansion mismatch between many materials, particularly a metal and ceramic member, requires the use of a ductile brazing material. Illustrative are the gold-nickel-titanium brazing alloys disclosed in U.S. Pat. No. 4,938,922. However, in order to achieve the desired ductility the titanium content of these alloys is generally maintained at very low levels, i.e. 0.1% to 2.0% weight percent.

The gold-nickel-titanium alloys of the noted patent may be employed in a single step process which produces a ductile brazed joint with excellent oxidation resistance at 650° C. and no visible reaction to acid and alkali treatment. The alloys are particularly suitable for brazing silicon nitride ceramic to Incolloy 909 alloy for use in internal combustion engines, and are currently produced and sold by The Morgan Crucible Company plc, Wesgo Division.

The gold-nickel-titanium alloys of the noted patent are also useful for brazing superalloys such as Incoriel 718 and other superalloys containing aluminum and/or titanium. Both aluminum and titanium are strong oxygen getters resulting in a thin layer of oxide upon heating such superalloys, making wetting with conventional alloys difficult. It has, however, been found that wetting can be accomplished by increasing the temperature until optimal wetting is obtained, but, to the detriment of prior brazes made at higher temperatures.

For example, a 50% gold–50% copper alloy with a liquidus temperature of 970° C. will typically flow at about 1,000° C. However, when brazing an Inconel 718 alloy, the brazing is generally performed at ~1,070° C. A copper member with a melting point of 1,083° C. may thus tend to melt close to a furnace heating element since most commercial furnaces exhibit temperature fluctuations of about 10°-25° C. within the furnace area.

The gold-nickel-titanium alloys disclosed in U.S. Pat. No. 4,938,922 will exhibit sufficient wetting to an alumina ceramic, but, over a very narrow temperature range of about 20° C. Exceeding this temperature results in dewetting—that is, the molten alloy beads tip leaving bare ceramic where molten brazing material formerly coated the surface.

It has, however, been found that if vanadium is substituted as the active metal in the brazing material, higher quantities of vanadium (compared to titanium) may be employed while still maintaining the desired ductility. The increased quantity of active metal, in this case vanadium, will also significantly enhance the wetting characteristics of the brazing material over a broader range of temperatures.

Illustrative are the ductile gold-based alloys described in principal but not exemplified in U.S. Pat. No. 4,606,978, containing gold, nickel, vanadium and, optionally, molybdenum to prevent high temperature creep. The molybdenum content for these alloys is, however, maintained at high levels, i.e., 6–40% by weight.

What has, however, recently been found is that the addition of very low levels of molybdenum to gold-nickel-vanadium brazing materials, such as those described in U.S. Pat. No. 4,606,978, will significantly enhance the ductility of the brazing material. The brazing material will therefore exhibit a low yield strength. The lower yield strength results in lower residual stress in a brazed joint since the plastic deformation of the brazing material accommodates the thermal expansion mismatch between articles being brazed. The brazing material will also be easier to mechanically reduce/deform (i.e., rolling processes), minimizing any edge cracking which is generally associated therewith.

It is therefore an object of the present invention to provide a brazing material that can be directly brazed to a substrate, particularly a metal, surface over a broader range of temperature and yield a highly ductile, oxidation and corrosion resistant brazed joint.

SUMMARY OF THE INVENTION

The improved brazing material of the present invention substantially reduces or eliminates the disadvantages and shortcomings associated with prior art materials. The invention specifically discloses brazing alloys and pastes containing gold, nickel, vanadium and, optionally, chromium and/or molybdenum.

The brazing materials of the present invention generally have liquidus temperatures in the range of from about 960° C. to about 1,100° C. The brazing materials are highly ductile and, after brazing, are relatively free of hard dispersed phases.

DETAILS OF PREFERRED EMBODIMENTS

The gold-nickel-vanadium-molybdenum brazing materials of the present invention comprise alloys and pastes. The brazing materials generally have a composition substantially comprised of, in weight percent: 75-98% gold, 0.5-20% nickel, 0.5-6% vanadium and 0.25-4% molybdenum, preferably 75-98% gold, 0.5-20% nickel, 2-3% vanadium, 0.5-1% molybdenum. More preferably, the brazing material substantially comprises, in weight percent: 82% gold, 15.5% nickel, 1.75 % vanadium, 0.75 % molybdenum.

It has been found that the higher gold content brazing materials of the present invention (compared to the alloys disclosed in U.S. Pat. No. 4,606,978), while still maintaining excellent ductility, generally exhibit a lower melting point and. therefore, would have little dissolving effect on metals during brazing. Such brazing materials may therefore be effectively employed to braze superalloys and refractory materials such as molybdenum, tungsten, niobium, platinum, etc. Thus, as will be recognized by one skilled in the art, the high gold content brazing materials within the scope of this invention may be specifically employed to achieve optimum brazing of ceramic/metal or metal/metal systems.

It has also been found that when vanadium is used as a reactive element in a gold-nickel brazing material, the resultant material is more ductile and, hence, exhibits a lower yield strength than gold-nickel-titanium brazing materials. The gold-nickel-vanadium brazing material also exhibits excellent wetting to ceramics and does not dewet when exposed to a wider brazing temperature range as compared to a gold-nickel-titanium brazing material.

The term "wetting", as used herein, generally describes the liquid distribution on solids. Specifically, when the brazing material is melted on the ceramic or metal substrate the material exhibits sufficient adherence to form a strong bond to the substrate. The term "dewetting" generally describes an inadequate liquid distribution on the substrate—that is, upon increasing the temperature by 10° to 20° C. the brazing material will tend to ball up leaving a bare spot where the material originally bonded.

It has also been found that the amount of vanadium which may be added to the basic gold-nickel brazing material and still maintain optimum ductility, is much greater than other reactive metals such as titanium and zirconium. According to the invention, the amount of vanadium may range from about 0.5% to 6% by weight and still maintain acceptable ductility. Since the ceramic wettability of the ductile gold-nickel-vanadium system is generally about 1.5–3.5% by weight vanadium, in the preferred embodiment the amount of vanadium is generally maintained at about 2%–3% by weight.

As previously stated, it has also been found that the addition of very low levels of molybdenum to gold-nickel-vanadium brazing materials will significantly enhance the ductility of the base material. The brazing material (i.e., alloy or paste) will, therefore, exhibit a low yield strength, minimizing the residual stress due to the thermal expansion of mismatched systems.

Thus, according to the invention, the molybdenum content of the disclosed brazing material is generally maintained at about 0.25% by weight to about 5.9% by weight, preferably 0.5–1% by weight. Higher levels of molybdenum content, i.e., >5.9% by weight, will tend to produce an undesirable increase in the liquidus temperature of the brazing material.

In further embodiments of the invention, chromium may be added to improve corrosion and oxidation resistance of the brazing materials. It has been found that the addition of chromium to the gold-nickel-vanadium brazing materials of the invention also results in an increase in ductility. Further, a low concentration of chromium (i.e., 0.5–1.5%) permits lowering of the vanadium content without affecting the wettability of the brazing materials to substrate surfaces.

According to the invention, the amount of chromium is generally maintained from about 0.3% by weight to about 5% by weight, preferably 1–3%, to achieve a ductile material. Accordingly, in further embodiments of the invention, the gold-nickel-vanadium-molybdenum brazing materials, with the addition of chromium, substantially comprise, in weight percent: 75–98% gold, 0.5–20% nickel, 0.5–6% vanadium, 0.25–4% molybdenum, 0.3–5% chromium. Preferably, the brazing material substantially comprises, in weight percent: 75–98% gold, 0.5–20% nickel, 2–3% vanadium, 0.5–1% molybdenum, 1–3% chromium. More preferably, 82% gold, 14.5% nickel, 1.75% vanadium, 0.75% molybdenum, 1% chromium.

The controls and examples which follow illustrate the gold-nickel-vanadium-molybdenum brazing materials of the present invention. The examples are for illustrative purposes only and are not meant to limit the scope of the claims in any way. p0 NOTE: ALL ALLOY COMPOSITIONS ARE IN WEIGHT PERCENT

EXAMPLE 1

An alloy of 82% Au, 15.5% Ni, 0.75% molybdenum, 1.75% V (Alloy #1) was plasma melted (via a tungsten electrode) in a water-cooled copper crucible under argon gas. A 7 gram melted button of the alloy was then hot rolled down to about 75 mil thickness. The alloy was substantially rolled down to 2 mil without intermediate anneal.

Four 2 mil foils were then placed on an alumina slab $1\frac{1}{4}'' \times 1\frac{1}{4}'' \times 0.2''$ thick and vacuum melted under $10^{-5}$ Torr vacuum at temperatures of 980° C., 990° C., 1,020° C., and 1,050° C., respectively. The brazing alloy exhibited a high metallic finish and did not dewet.

EXAMPLE 2

A small alumina cylinder ($\frac{3}{8}''$ dia. $\times \frac{1}{2}''$ long) was brazed to a molybdenum plate, $1'' \times 1'' \times 0.020''$ thick at 1,000° C. under $10^{-5}$ Torr vacuum. employing the alloy described in Example 1. The brazing alloy exhibited a high metallic finish and did not dewet. This joint also tested less than $10^{-9}$ cc/sec. on leak rate testing, using a helium mass spectrograph.

EXAMPLE 3

An alloy of 82% gold, 14.5% nickel, 1% chromium, 0.75% molybdenum, 1.75% vanadium (Alloy #3) was prepared and tested as in Example 1 with similar excellent results.

The brazing material compositions investigated and falling within the scope of this invention are provided in Table I.

TABLE I

| Alloy No. | ELEMENTS (% by wt.) | | | | | Solidus °C. | Liquidus °C. | KNH |
|---|---|---|---|---|---|---|---|---|
| | Au | Ni | V | Cr | Mo | | | |
| 1 | 82.00 | 15.50 | 1.75 | | 0.75 | 950 | 960 | (190) |
| 2 | 82.00 | 15.50 | 1.50 | | 1.00 | 950 | 965 | |
| 3 | 82.00 | 14.50 | 1.75 | 1.00 | 0.75 | 953 | 980 | (186) |
| 4 | 82.00 | 15.00 | 1.50 | 1.00 | 0.50 | 940 | 960 | |
| 5 | 82.00 | 14.25 | 1.00 | 2.00 | 0.75 | 947 | 968 | |

Alloy Nos. 1–5 exhibited excellent wettability to a variety of materials, including alumina ceramic. The brazed joints also exhibited a high metallic finish and a fine grain structure.

Without departing from the spirit and scope of this invention, one of ordinary skill can make various changes and modifications to the invention to adapt it to various usages and conditions. As such, these changes and modifications are properly, equitably, and intended to be, within the full range of equivalents of the following claims.

What is claimed is:

1. A ductile brazing material for brazing a first material and a second material having a liquidus temperature of approximately 960° C. to 1,100° C., said brazing material consisting essentially of, in weight percent: 75–98% gold, 0.5–20% nickel, 0.5–6% vanadium, 0.25–5.9% molybdenum, 0–5% chromium.

2. The brazing material of claim 1 wherein said brazing material consists essentially of, in weight percent: 75–98% gold, 0.5–20% nickel, 2–3% vanadium, 0.5–1% molybdenum.

3. The brazing material of claim 1 wherein said brazing material consists essentially of, in weight percent: 82% gold, 15.5% nickel, 1.75% vanadium, 0.75% molybdenum.

4. The brazing material of claim 1 wherein said brazing material consists essentially of, in weight percent: 75–98% gold, 0.5–20% nickel, 2–3% vanadium, 0.5–1% molybdenum, 1–3% chromium.

5. The brazing material of claim 1 wherein said brazing material consists essentially of, in weight percent: 82% gold, 14.5% nickel, 1.75% vanadium, 0.75% molybdenum, 1% chromium.

6. A braze joint comprising a first material selected from the group consisting of metals, ceramics and mixtures thereof, a second material selected from the group consisting of metals, ceramics and mixtures thereof and a ductile brazing material disposed between said first and said second materials having a composition consisting essentially of, in weight percent: 75–98% gold, 0.5–20% nickel, 0.5–6% vanadium. 0.25–5.9% molybdenum, 0–5% chromium.

7. The braze joint of claim 6 wherein said brazing material comprises an alloy.

8. The braze joint of claim 6 wherein said brazing material comprises a paste.

* * * * *